United States Patent [19]

Kwok

[11] Patent Number: 5,441,805
[45] Date of Patent: Aug. 15, 1995

[54] SOLUBLE LAMINATES

[75] Inventor: John Kwok, Holden, Mass.

[73] Assignee: Camelot Technologies Inc., Leominster, Mass.

[21] Appl. No.: 85,025

[22] Filed: Jun. 30, 1993

[51] Int. Cl.$^6$ .............................................. B32B 27/08
[52] U.S. Cl. ................... 428/339; 428/500; 428/520; 428/36.6
[58] Field of Search ............... 428/500, 520, 339, 36.6

[56] References Cited

U.S. PATENT DOCUMENTS

| | | | |
|---|---|---|---|
| 3,072,618 | 1/1963 | Turbak | 260/79.3 |
| 3,205,285 | 9/1965 | Turbak et al. | 260/89.7 |
| 4,261,066 | 4/1981 | Belz | 4/222 |
| 4,469,728 | 9/1984 | Belz | 428/36 |
| 4,671,982 | 6/1987 | Belz | 428/90 |
| 5,009,648 | 4/1991 | Arnoff et al. | 604/332 |
| 5,280,079 | 1/1994 | Allen et al. | |

Primary Examiner—Edith Buffalow
Attorney, Agent, or Firm—Bruce E. Harang

[57] ABSTRACT

A water soluble laminate may be prepared comprising one or more relatively water insoluble layers of polymers such as polyvinyl alcohol or crosslinked polyvinyl alcohol and one or more relatively more water soluble layers such as linear uncrosslinked sulphonated vinylaromatic polymers.

25 Claims, No Drawings

SOLUBLE LAMINATES

FIELD OF THE INVENTION

The present invention relates to laminates of a water soluble polymer and a water insoluble polymer. More particularly the present invention relates to laminates of a sulphonated water soluble polymer and a degradable water insoluble polymer.

BACKGROUND OF THE INVENTION

There are a number of uses of laminates or foils comprising a water soluble polymer and a water insoluble polymer. One such use is in laundry hampers for hospitals. Such hampers may be made of a relatively strong water soluble polymer. For the laundry hampers the outer layer is relative thick and provides most of the mechanical strength of the hamper. The outer layer is also a water soluble polymer. When the hamper is placed in a washing machine the outer layer dissolves. The inner layer of the hamper is a relatively thin layer of insoluble polymer to protect the water soluble polymer from any dampness in the laundry. The full hamper is placed in a washing machine and the outer layer dissolves. The thin inner layer breaks under the mechanical action in the washing machine. The polymers are then discharged with the water from the washing machine. Of course the hamper technology would have potential use in the disposable diaper industry. This technology might also be applicable in food packaging applications such as for foods which are moistened or cooked in water.

There are a series of patents in the name of Roland K. Belz which disclose similar laminates. In these patents the water soluble layer comprises an acrylate polymer which is soluble only in alkaline or acidic mediums. Representative of such patents are U.S. Pat. No. 4,261,066 issued Apr. 14, 1981; U.S. Pat. No. 4,469,728 issued Sep. 4, 1984; and U.S. Pat. No. 4,671,982 issued Jun. 9, 1987. The Belz patents appear to be mainly concerned with the use of foils in sanitary applications such as covers for toilet seats.

Polyvinyl alcohol is a unique polymer in that it may be used as both a water soluble and water insoluble polymer. The properties of polyvinyl alcohol are discussed at Volume 23, page 849 of the Kirk-Othmer Encyclopedia of Chemistry and Technology. One other advantage that polymers based on polyvinyl alcohol have is that they are biodegradable.

Sulphonated polymers containing aromatic rings have been known for some time. Such polymers have been disclosed in U.S. Pat. No. 3,072,618 patented Jan. 8, 1963 in the name of Albin F. Turbak, assigned to Esso Research and Engineering Company. The patent teaches that such water soluble polymers are useful in a number of applications including thickeners, impregnants, adhesives, soil conditioners and textile-sizes. The patent does not suggest that such polymers could be made into films which would be useful in laminate applications.

More recently sulphonated crosslinked polymers containing aromatic tings have been used as ion exchange resins. However, due to the nature of there use such polymers are insoluble.

The present patent application seeks to provide novel laminates of a water insoluble layer and a water soluble layer.

SUMMARY OF THE INVENTION

Accordingly, the present invention provides a laminate comprising one or more layers of a relatively water insoluble polymer comprising polyvinyl acetate which has been hydrolysed to not less than 98% and one or more layers of water soluble polymer comprising a sulphonated noncrosslinked polymer selected from the group consisting of:
(a) polymers of one or more $C_{8-12}$ vinyl aromatic monomers which are unsubstituted or substituted by $C_{1-4}$ alkyl radicals;
(b) copolymers comprising from 10 to 40 weight % of a copolymer comprising 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{3-8}$ vinyl nitriles which have been grafted onto from 90 to 60 weight % of a homopolymer of one or more $C_{4-6}$ conjugated diolefins;
(c) copolymers comprising from 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{4-6}$ conjugated diolefins;
(d) copolymers comprising from 95 to 60 weight % of one or more $C_{8-12}$ vinyl aromatic monomers which are unsubstituted or substituted by a $C_{1-4}$ alkyl radical or a chlorine atom and from 5 to 40 weight % of one or more $C_{3-8}$ vinyl nitriles; and
(e) copolymers comprising from 50 to 90 weight % of one or more $C_{8-12}$ vinyl aromatic monomers which are unsubstituted or substituted by a $C_{1-4}$ alkyl radical and from 50 to 10 weight % of one or more $C_{1-4}$ alkyl or hydroxy alkyl esters of $C_{3-6}$ ethylenically unsaturated carboxylic acids;
which polymers have been sulphonated to an extent to provide one sulphonate group per aromatic ring in the polymer.

DETAILED DESCRIPTION

The water soluble polymers useful in accordance with the present invention are noncrosslinked sulphonated polymers in which the base polymer (e.g. before sulphonation) is selected from the group consisting of:
(a) polymers of one or more $C_{8-12}$ vinyl aromatic monomers which are unsubstituted or substituted by $C_{1-4}$ alkyl radicals;
(b) copolymers comprising from 10 to 40 weight % of a copolymer comprising 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{3-8}$ vinyl nitriles which have been grafted onto from 90 to 60 weight % of a homopolymer of one or more $C_{4-6}$ conjugated diolefins;
(c) copolymers comprising from 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{4-6}$ conjugated diolefins;
(d) copolymers comprising from 95 to 60 weight % of one or more $C_{8-12}$ vinyl aromatic monomers which are unsubstituted or substituted by a $C_{1-4}$ alkyl radical or a chlorine atom and from 5 to 40 weight % of one or more $C_{3-8}$ vinyl nitriles; and
(e) copolymers comprising from 50 to 90 weight % of one or more $C_{8-12}$ vinyl aromatic monomers which are unsubstituted or substituted by a $C_{1-4}$ alkyl radical and from 50 to 10 weight % of one or more $C_{1-4}$ alkyl or hydroxy alkyl esters of $C_{3-6}$ ethylenically unsaturated carboxylic acids;

which polymers have been sulphonated to an extent to provide one sulphonate group per aromatic ring in the polymer. Optionally, the sulphonate groups are neutralized with a base selected from the group consisting of alkali metal salts or hydroxides, most preferably sodium or potassium hydroxide, and ammonia.

In the above polymers:
  (a) suitable $C_{8-12}$ vinyl aromatic monomers which are unsubstituted or substituted by a $C_{1-4}$ alkyl radical include styrene, α-methyl styrene, p-methyl styrene, and p-tertiary butyl styrene;
  (b) suitable $C_{3-8}$ vinyl nitriles include acrylonitrile and methacrylonitrile;
  (c) suitable $C_{4-6}$ conjugated diolefins include butadiene and isoprene; and
  (d) suitable $C_{1-4}$ alkyl or hydroxy alkyl esters of $C_{3-6}$ ethylenically unsaturated carboxylic acids selected include methyl methacrylate, ethyl methacrylate, butyl methylacrylate, methyl acrylate, ethyl acrylate, and butyl acrylate.

A particularly preferred water soluble polymer is sulphonated polystyrene.

If the water soluble polymer comprises a copolymer of a vinyl aromatic monomer and a nitrile monomer grafted to a polymer of a conjugated diolefin the polymer may be an acrylonitrile butadiene styrene polymer (ABS).

If the water soluble polymer comprises a copolymer of a vinyl aromatic monomer and conjugated diolefin the polymer may be a copolymer of styrene and butadiene. Generally polymers having a compositions within the ranges specified in the present patent application are rubbers. These polymers may be styrene butadiene rubbers (SBR) which are commercially available.

If the water soluble polymer comprises a copolymer of a vinyl aromatic monomer and a vinyl nitrile it may be a copolymer of styrene and acrylonitrile. Generally, polymers having a compositions within the ranges specified in the present patent application are rubbers. These polymers are the nitrile rubbers which are commercially available.

If the water soluble polymer comprises a copolymer of a vinyl aromatic monomer and an alkyl or hydroxy alkyl ester of an ethylenically unsaturated carboxylic acid the polymer may be a styrene acrylate. Such polymers are readily commercially available.

The water soluble polymer must be noncrosslinked and sulphonated. Generally, sulphonation introduces crosslinks into the above noted base polymers. As used in this specification "noncrosslinked" means that the polymer is uncrosslinked or crosslinked only to a degree which will not interfere with its solubility in water.

The degree of crosslinking during the sulphonation process can be controlled or eliminated if the base polymer is sulphonated in accordance with the teaching of U.S. Pat. No. 3,072,618 issued Jan. 8, 1963 assigned to Esso Research and Engineering Company.

Typically the base polymer is dissolved in an organic solvent for the base polymer but which is not a good solvent for the sulphonated polymer. A useful solvent is dichloroethane. There is added to the solution of base polymer a mixture comprising a trialkyl phosphate and sulphur trioxide in a molar ratio from 1:1 to 1:4. Preferably the molar ratio of trialkyl phosphate to sulphur trioxide is from 1:2 to 1:3. The mole ratio of sulphur trioxide to base polymer should be sufficient to provide for at least one sulphonate group per aromatic ring but not in excess to cause crosslinking. Generally, the mole ratio of sulphur trioxide to base polymer may range from 1:5 to 1:0.5 preferably about 1:1.

Suitable trialkyl phosphates include tri-$C_{1-4}$ alkyl phosphates. A particularly useful trialkyl phosphate is triethyl phosphate.

Sulphur trioxide is a liquid at temperatures up to about 45° C. and has a density of about 1.9. The sulphur trioxide may be used in the form of a solution dissolved in the organic solvent or an organic solvent soluble in or miscible with the organic solvent. The $SO_3$ may be used as 100% (pure $SO_3$) or obtained from an $SO_3$ generator or donor such as oleum. If oleum is used as a generator or donor it is mixed with the solvent and the excess sulphuric acid is separated from the oleum solvent mixture prior to the formation of the $SO_3$-trialkyl phosphate mixture or complex (e.g. the trialkyl phosphate is added to the solution after separation of the $H_2SO_4$). It is believed that the $SO_3$ and trialkyl phosphate form a complex.

The sulphonated base polymer then precipitates from the solution. The polymer may be separated form the solution using conventional techniques such as filtering or decanting.

Optionally, the resulting sulphonated polymer may be neutralized with a fixed alkali such as a hydroxides of group I metals, preferably sodium or potassium, or an organic base such as ammonium hydroxide, ethanolamine or other suitable organic bases in alcoholic medium, generally comprising a $C_{1-4}$ alcohol. The salts resulting from the neutralization of the sulphonated vinyl aromatic polymer may be removed from the polymer with the following treatment with a $C_{1-4}$ alkanol. The process may comprise suspending and/or washing the neutralized sulphonated polymer with a $C_{1-4}$ alkanol. The $C_{1-4}$ alkanol should contain as little water as practicable as the water will dissolve the polymer. Preferred alkanols include methanol, ethanol, and propanol.

The sulphonated water soluble polymer may then be formed into a film. The polymer may be dissolved in a solvent such as water and cast to form a film. The polymer may also be extruded as a thin film. Typically the final thickness of the film will be from 0.5 to 30, preferably from 1 to 15 mils. This is the dry thickness of film. Accordingly, the thickness of the solution from which the film is cast would be thicker to allow for the water.

The relatively water insoluble polymer in accordance with the present invention is a biodegradable polymer having a low solubility in water at ambient temperature. Preferably the polymer is polyvinyl acetate which has been hydrolysed to not less than 98%. In effect this polymer is polyvinyl alcohol. If polyvinyl acetate is hydrolysed to less than 98% it is soluble in water at ambient temperature (cold water). However, if it is hydrolysed to more than 98% it is soluble only in warm water. If desired the solubility of the polyvinyl alcohol may be further reduced by heat treatment or by crosslinking with a multifunctional aldehyde such as glyoxal.

The highly hydrolysed polyvinyl acetate may be prepared as a film by casting. It is dissolved in a suitable solvent such as a hot water, and cast as a film. In the alternative the polymer could be extruded. The thickness of the water insoluble or relatively less water soluble film should be from about 0.5 to 30, preferably from 1 to 15 most preferably from about 1 to 10 mils.

If the film of the water soluble and relatively water insoluble polymer are prepared by casting the films may be laminated together. Typically the films may be brought together from an source such as an unwind stand or an accumulator and then passed through the nips of one or more calender rolls. These rolls may comprise a series of polished steel rolls. The rolls may be cooled to prevent overheating due to friction. Typically in normal operation webs may pass through the calender rolls at speeds up to about 3,000 ft. per minute. The temperature of the web as it passes through the stack of one or more calender rolls should reach the softening temperature of the material having the lower softening temperature. The films will then be pressed together by the rolls and will adhere to each other. The operation of calender rolls in laminating is well known and understood by those skilled in the art. The process has been described for a laminate of two webs. It should be born in mind that the laminates of the present invention may comprise more than two webs.

An alternative process would be to co-extrude the layers of water soluble and water insoluble polymer. First the higher melting polymer would be extruded as a film having the appropriate thickness would be extruded. When it had cooled to the softening temperature of the lower softening temperature polymer the lower softening temperature polymer would be extruded onto the first film or web. This sequence prevents a hotter material being extruded onto a material which would melt at the extrusion temperature of the hotter material. If necessary the coextruded webs may also be subjected to a calender operation as described above.

It should be noted that the hydrolysed polyvinyl acetate will have a melting temperature below 230° C. but that it has poor flow characteristics. Accordingly, it will be necessary to plasticize the polymer. Suitable polymers will include the low molecular weight glycols such as ethylene or propylene glycol having a molecular weight less than about 10,000, preferably less than about 8,000.

Preferably the sulphonated linear polymer should have a melting temperature of less than about 180° C., most preferably from about 100° to 140° C.

If the polymers are extruded the extruder will have a number of zones within the barrel having a temperature above the melting temperature of the plastic or plasticized plastic. The temperature of the zones within the barrel and of the die should not be so high as to cause degradation of the plastic. Typical barrel temperatures range from about 150° to 210° C., most preferably from about 160° to 185° C. The screw in the extruder will typically have an L:D ratio from about 24:1 to about 40:1. The extruder may be operated at speeds from about 50 to 150, preferably from about 80 to 120, RPM's.

The polymers used to prepare the laminate may contain small amounts of conventional additives such as heat and light stabilizers. Typically these additives will be used in a total amount of less than 15, preferably less than 5 weight %. The polymers may also be filled. Typically, the filler may be an inorganic compound such as clay, talc, or calcium carbonate. However, the filler may be an organic filler. Most preferably the filler will be a cellulosic filler, preferably selected from the group consisting of: starch, functionalized starch, cellulose, functionalized cellulose, wood flour, flour of nut shells, cotton and linen fibre, flock, or flour or a mixture thereof. Particularly useful fillers may be selected from the group consisting off starch, functionalized starch, α-cellulose, functionalized cellulose, wood flour and nut shell flour or a mixture thereof.

If present the filler will typically be used in amounts form about 2 to 60, more preferably from about 5 to 50 most preferably from 20 to 50 weight %.

The present invention will now be illustrated, and not limited by the following examples. In the examples-unless otherwise indicated parts means parts by weight and % means weight %.

EXAMPLE 1

Sulphonated Polymer

About 165 g of polystyrene was dissolved in 2,800 g of dichloroethane. To the resulting solution was added a solution comprising 205 g of triethylphosphate and 132 ml of sulphur trioxide (molar ratio of 1:3) in about 2,400 g of dichloroethane. The reaction mixture was stirred for one hour at room temperature. The precipitate resulting from the reaction was filtered and washed and neutralized in methanol and 50% NaOH.

The resulting sulphonated polymer was dissolved in cold water to form a 50% solution.

Relatively Water Insoluble Layer

98% hydrolysed polyvinyl acetate purchased commercially under the trademark MOWIOL® (trademark of I. G. Farben) was dissolved in hot water to form a 10% solution. The solution was drawn down on an aluminum foil at a wet thickness of 12.5 mils. The film was dried for 24 hours to yield a film having a thickness of about 0.5 mils. A small square of polytetrafluoroethylene (sold in association with the trademark TEFLON®) tape was places in the centre of each film of 98% hydrolysed polyvinyl acetate.

Laminate

Over the square of tape and the film of polyvinyl acetate was drawn down a 50% solution of sulphonated polystyrene at a wet thickness of 5 mils (which on drying gave a dry thickness of about 2.5 mils. On one of the samples prepared as above a further 0.5 mil thick layer of hydrolysed polyvinyl acetate was laminated over the exposed surface of the sulphonated polystyrene (e.g. the exposed back). As a result there was a two layer laminate having a hydrolysed polyvinyl acetate surface and a sulphonated polystyrene surface and there was a "sandwich" of sulphonated polystyrene between hydrolysed polyvinyl acetate.

Solubility

The films were removed from the aluminum foil. The films were then placed in a beaker of room temperature water which was stirred with a magnetic stirrer. The two layer laminate was placed with the hydrolysed polyvinyl acetate side down in the water. The three layer laminate was in the beaker with one of the polyvinyl acetate sides down in the water. The time from placing the laminate in the water until the polytetrafluoroethylene tape floated free was measured. For the two layered laminate the time for the tape to float free was 45 seconds. For the three layered "sandwich" the time for the tape to float free was 7 minutes and 20 seconds.

The experiment demonstrates that hydrolysed polyvinyl acetate does serve as a protective barrier for water soluble sulphonated styrene containing polymers.

One of the difficulties with the two layered laminate was that the polyvinyl acetate was quickly swollen with water. The water then began to dissolve the sulphonated polystyrene. The swell rate of the polyvinyl acetate could be reduced by either heat treatment of the polyvinyl acetate or by crosslinking it with a suitable agent.

The embodiments of the invention in which an exclusive property or privilege is claimed are defined as follows:

1. A laminate comprising one or more layers of a relatively water insoluble polymer comprising polyvinyl acetate which has been hydrolysed to not less than 98% and one or more layers of water soluble polymer comprising a sulphonated noncrosslinked polymer selected from the group consisting of:
   (a) polymers of one or more $C_{8-12}$ vinyl aromatic monomers which are unsubstituted or substituted by $C_{1-4}$ alkyl radicals;
   (b) copolymers comprising from 10 to 40 weight % of a copolymer comprising 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{3-8}$ vinyl nitriles which have been grafted onto from 90 to 60 weight % of a homopolymer of one or more $C_{4-6}$ conjugated diolefins;
   (c) copolymers comprising from 40 to 60 weight % of one or more $C_{8-12}$ vinyl aromatic monomers which are unsubstituted or substituted by a $C_{1-4}$ alkyl radical or a chlorine atom and from 60 to 40 weight % of one or more $C_{4-6}$ conjugated diolefins;
   (d) copolymers comprising from 95 to 60 weight % of one or more $C_{8-12}$ vinyl aromatic monomers which are unsubstituted or substituted by a $C_{1-4}$ alkyl radical or a chlorine atom and from 5 to 40 weight % of one or more $C_{3-8}$ vinyl nitriles; and
   (e) copolymers comprising from 50 to 90 weight % of one or more $C_{8-12}$ vinyl aromatic monomers which are unsubstituted or substituted by a $C_{1-4}$ alkyl radical and from 50 to 10 weight % of one or more alkyl or hydroxy alkyl esters of $C_{3-6}$ ethylenically unsaturated carboxylic acids;
which polymers have been sulphonated to an extent to provide one sulphonate group per aromatic ring in the polymer.

2. The laminate according to claim 1, wherein said one or more layers of a relatively water insoluble polymer have a thickness from 0.5 to 30 mils.

3. The laminate according to claim 2, wherein said one or more layers of a water soluble polymer have a thickness from 0.5 to 30 mils.

4. The laminate according to claim 3, wherein said sulphonated noncrosslinked polymer has optionally been neutralized.

5. The laminate according to claim 3, wherein said sulphonated noncrosslinked polymer has optionally been neutralized with one or more members selected from the group consisting of sodium hydroxide, potassium hydroxide and ammonium hydroxide.

6. The laminate according to claim 3, wherein said water soluble layer further comprises an agent selected from the group consisting of: water-soluble carbonates, secondary and tertiary phosphates, silicates, borates and amines.

7. The laminate according to claim 3, wherein said water soluble polymer is a polymer of one or more monomers selected from the group consisting of styrene, α-methyl styrene, p-methyl styrene, and p-tertiary butyl styrene.

8. The laminate according to claim 3, wherein said water soluble polymer comprises from 10 to 40 weight % of a copolymer comprising 40 to 60 weight % of one or more $C_{8-12}$ vinyl aromatic monomers selected from the group consisting of styrene, α-methyl styrene, p-methyl styrene, and p-tertiary butyl styrene, and from 60 to 40 weight % of one or more $C_{3-8}$ vinyl nitriles selected from the group consisting of acrylonitrile and methacrylonitrile, which polymers have been grafted onto from 90 to 60 weight % of a homopolymer of one or more $C_{4-6}$ conjugated diolefins.

9. The laminate according to claim 3, wherein said water soluble polymer comprises from 40 to 60 weight % of one or more $C_{8-12}$ vinyl aromatic monomers selected from the group consisting of styrene, α-methyl styrene, p-methyl styrene, and p-tertiary butyl styrene, and from 60 to 40 weight % of one or more $C_{4-6}$ conjugated diolefins.

10. The laminate according to claim 3, wherein said water soluble polymer comprises from 50 to 90 weight % of one or more $C_{8-12}$ vinyl aromatic monomers selected from the group consisting of styrene, α-methyl styrene, p-methyl styrene, and p-tertiary butyl styrene, and from 50 to 10 weight % of one or more $C_{1-4}$ alkyl or hydroxy alkyl esters of $C_{3-6}$ ethylenically unsaturated carboxylic acids selected from the group consisting of methyl methacrylate, ethyl methacrylate, butyl methylacrylate, methyl acrylate, ethyl acrylate, and butyl acrylate.

11. The laminate according to claim 3 wherein the water soluble polymer comprises from 95 to 60 weight % of one or more $C_{8-12}$ vinyl aromatic monomers selected from the group consisting of styrene, α-methyl styrene, p-methyl styrene, and p-tertiary butyl styrene, and from 5 to 40 weight % of one or more $C_{3-8}$ vinyl nitriles selected from the group consisting of acrylonitrile and methacrylonitrile.

12. The laminate according to claim 5, wherein said water soluble layer further comprises an agent selected from the group consisting of: water-soluble carbonates, secondary and tertiary phosphates, silicates, borates and amines.

13. The laminate according to claim 5, wherein said water soluble polymer is a polymer of one or more monomers selected from the group consisting of styrene, α-methyl styrene, p-methyl styrene, and p-tertiary butyl styrene.

14. The laminate according to claim 5, wherein said water soluble polymer comprises from 10 to 40 weight % of a copolymer comprising 40 to 60 weight % of one or more $C_{8-12}$ vinyl aromatic monomers selected from the group consisting of styrene, α-methyl styrene, p-methyl styrene, and p-tertiary butyl styrene, and from 60 to 40 weight % of one or more $C_{3-8}$ vinyl nitriles selected from the group consisting of acrylonitrile and methacrylonitrile, which polymers have been grafted onto from 90 to 60 weight % of a homopolymer of one or more $C_{4-6}$ conjugated diolefins.

15. The laminate according to claim 5, wherein said water soluble polymer comprises from 40 to 60 weight % of one or more $C_{8-12}$ vinyl aromatic monomers selected from the group consisting of styrene, α-methyl styrene, p-methyl styrene, and p-tertiary butyl styrene, and from 60 to 40 weight % of one or more $C_{4-6}$ conjugated diolefins.

16. The laminate according to claim 5, wherein said water soluble polymer comprises from 50 to 90 weight % of one or more $C_{8-12}$ vinyl aromatic monomers selected from the group consisting of styrene, α-methyl styrene, p-methyl styrene, and p-tertiary butyl styrene, and from 50 to 10 weight % of one or more $C_{1-4}$ alkyl or hydroxy alkyl esters of $C_{3-6}$ ethylenically unsaturated carboxylic acids selected from the group consisting of methyl methacrylate, ethyl methacrylate, butyl methylacrylate, methyl acrylate, ethyl acrylate, and butyl acrylate.

17. The laminate according to claim 5, wherein the water soluble polymer comprises from 95 to 60 weight % of one or more $C_{8-12}$ vinyl aromatic monomers selected from the group consisting of styrene, α-methyl styrene, p-methyl styrene, and p-tertiary butyl styrene, and from 5 to 40 weight % of one or more $C_{3-8}$ vinyl nitriles selected from the group consisting of acrylonitrile and methacrylonitrile.

18. The laminate according to claim 3, wherein said polyvinyl acetate has been crosslinked.

19. The laminate according to claim 5, wherein said polyvinyl acetate has been crosslinked.

20. The laminate according to claim 3, comprising a central layer of water soluble polymer between two layers of polyvinyl acetate.

21. The laminate according to claim 5, comprising a central layer of water soluble polymer between two layers of polyvinyl acetate.

22. The laminate according to claim 20, wherein said water soluble polymer comprises sulphonated polystyrene.

23. The laminate according to claim 21, wherein said water soluble polymer comprises sulphonated polystyrene.

24. The laminate according to claim 22, wherein said polyvinyl acetate has been crosslinked.

25. The laminate according to claim 23, wherein said polyvinyl acetate has been crosslinked.

* * * * *